Patented Apr. 2, 1946

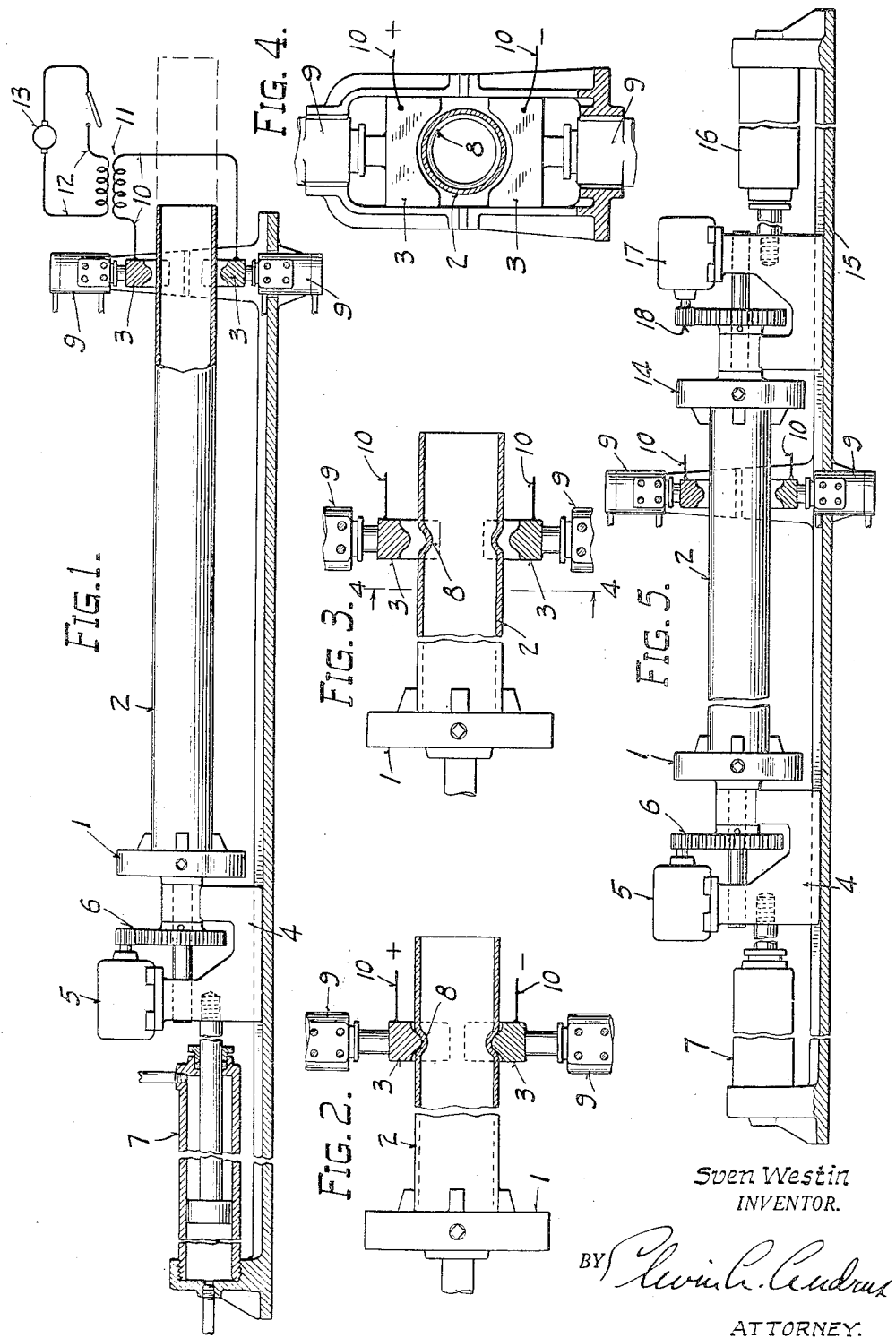

2,397,717

UNITED STATES PATENT OFFICE 2,397,717

METHOD AND APPARATUS FOR ELECTRICALLY HEATING AND FORMING METAL BODIES

Sven Westin, West Allis, Wis., assignor to A. O. Smith Corporation, Milwaukee, Wis., a corporation of New York Application July 3, 1944, Serial No. 543,231

9 Claims. (Cl. 219—3)

This invention relates to a method and apparatus for electrically heating and forming metal bodies.

This application constitutes a continuation in part of applicant's co-pending application Serial No. 463,957, filed October 30, 1942, for Method and apparatus for electrically forming pipe, now Patent No. 2,374,794, dated May 1, 1945.

The principal object of the invention is to provide a method of electrically heating and forming circumferential or circular corrugations or shapes in tubular or bar work pieces.

Another object is to provide an apparatus employing electrode dies for engaging a work piece and in which the dies are movable radially during the forming operation to effect shaping of the piece.

An embodiment of the invention is illustrated in the accompanying drawing in which:

Figure 1 is an axial section through an apparatus for forming a corrugation in a tubular work piece and showing a cylindrical tube positioned therein for forming;

Fig. 2 is a similar section showing the forming operation;

Fig. 3 is a similar section showing the withdrawal of the dies and release of the formed piece;

Fig. 4 is a transverse section taken on line 4—4 of Fig. 3 and showing the apparatus in end elevation; and Fig. 5 is a side elevation of the apparatus of Fig. 1 showing the addition thereto of a second chuck for effecting thickening or thinning of the work piece.

The apparatus comprises in general a rotary chuck 1 for rotatably supporting the tubular work piece 2 and for moving the same into and out of forming position, and the radially movable forming die electrodes 3 for forming the work piece.

The chuck 1 is mounted on a longitudinally slidable pedestal 4 and rotated by a motor 5 and reduction gearing 6 also carried by the pedestal. A hydraulic cylinder 7 is disposed to move the pedestal 4 longitudinally to locate the work piece in the forming dies 3.

The forming apparatus comprises two or more electrode dies 3, opposed to each other radially about the circumference of the work piece and having their die surfaces shaped to provide the desired contour for the final corrugation 8 in the work piece.

The dies 3 are mounted for radial movement toward and away from each other under the control of hydraulic cylinders 9 or of some mechanical power mechanism. They are adapted to move inwardly upon the work piece to form the same.

The dies 3 are circumferentially spaced apart and constitute opposite electrodes of a supply circuit 10 for supplying electricity to the blank as the latter rotates in contact with them. For this purpose the leads of circuit 10 connect the dies to the secondary of a transformer 11. Leads 12 connect the primary of the transformer 11 to source 13 of electric current.

In operation, the tubular blank 2 is gripped at one end by the chuck 1 and then moved longitudinally into the forming apparatus until the dies 3 encircle the desired location for corrugation 8. Then the chuck 1 is rotated, thereby rotating the blank, and the heating current being applied to the die electrodes 3 by transformer 11, the dies 3 are moved radially inwardly to contact and press against the surface of the rotating blank. The electricity being supplied to the dies passes through the circumferential portions of the blank between the die electrodes and heats only the portion to be formed.

Heating the circumferential portion of the blank contacted by the dies softens it and allows it to yield to the radial pressure of the dies and the latter move progressively inwardly until the corrugation 8 or other shape is completed in the blank.

Upon completion of the corrugation 8 or other forming operation, the heating current is discontinued and the dies 3 are withdrawn radially outward from the blank 2. The formed blank may then be moved longitudinally to a new location for forming a corrugation therein adjacent to the first corrugation, or it may be removed from the forming apparatus.

In the forming of different shapes it is possible to provide for a combined longitudinal feed of the blank and radial feed of the electrode dies during the forming operation, in which case various tapers may be provided in the blank.

Where it is desired to control the thickness of the blank in the region of forming, it is possible to apply either longitudinal compression forces or longitudinal tensile forces to the blank during the forming operation.

This may best be accomplished, as shown in Fig. 5, by providing an additional rotary end chuck 14 to grip the leading end of the blank 2. The chuck 14 is mounted on a slide 15 along which it may be moved by hydraulic cylinder 16. The chuck may be rotated by a motor 17 and reduction gearing 18.

In operation the chucks 1 and 14 should be rotated at the same speed and they may be moved toward one another during the forming operation to facilitate or compensate for the endwise contraction of the blank and maintain or increase its thickness in the formed region. If desired the chucks may be held against longitudinal movement or even moved apart during the forming operation for the purpose of thinning the blank in the region of forming. Any desired combination of end movement can be employed with the radial forming to produce shapes of various kinds.

Various embodiments of the invention may be employed within the scope of the accompanying claims.

I claim:

1. The method of reducing and forming a circular blank for a portion of its length, comprising disposing the same in a restricted die opening constituted of a plurality of spaced die electrodes supplying heating current to the blank from one of said electrodes to another while the electrodes and blank are relatively rotated under conditions of radial pressure therebetween to effect a reduction in diameter and forming of the blank, and thereafter separating the electrodes and removing the blank therefrom.

2. The method of reducing and forming a circular blank for a portion of its length, comprising disposing the same in a restricted die opening constituted of a plurality of radially movable spaced die electrodes for supplying heating current and forming pressure to the blank, relatively rotating the blank in the die opening, and moving the dies radially inward into pressure contact with the blank to effect simultaneous heating of the blank by the passage of current therethrough from one of said electrodes to another and forming of the blank.

3. The method of reducing and forming a circular blank for a portion of its length, comprising disposing the same in a restricted die opening constituted of a plurality of radially movable spaced die electrodes for supplying heating current and forming pressure to the blank, relatively rotating the blank in the die opening, moving the dies radially inward into pressure contact with the blank to effect simultaneous heating and forming of the same, and moving the blank longitudinally relative to the dies during the forming operation to effect tapering of the blank.

4. The method of reducing and forming a cylindrical blank, comprising rotating the blank, and moving a plurality of circumferentially spaced electrode forming dies radially inward thereagainst, said dies supplying heating current flowing circumferentially through the blank from one of said dies to another in the region of forming of the blank.

5. The method of reducing and forming a cylindrical blank, comprising rotating the blank, moving a plurality of circumferentially spaced electrode forming dies radially inward thereagainst, said dies supplying heating current flowing circumferentially through the blank in the region of forming thereof, and applying differential longitudinal forces to the opposite ends of the blank to facilitate the forming operation.

6. The method of reducing and forming a cylindrical tubular blank, comprising rotating the blank, moving a plurality of circumferentially spaced electrode forming dies radially thereagainst, said dies supplying heating current flowing circumferentially through the blank in the region of forming thereof, and applying differential longitudinal forces to the opposite ends of the blank to control the wall thickness thereof in the forming region.

7. In apparatus for electric forming operations, a plurality of circumferentially spaced electrode dies arranged in a circle to receive a circular blank to be formed, means to move said dies radially into pressure contact with the work blank, means to rotate the blank in said dies, and means to supply heating current to the dies to effect resistance heating of the blank by the flow of current through the blank from one of said dies to another in the circumferential path of the dies thereagainst.

8. In apparatus for electric forming operations, a plurality of circumferentially spaced electrode dies arranged in a circle to receive a circular blank to be formed, means to move said dies radially into pressure contact with the work blank, means to rotate the blank in said dies, means to supply heating current to the dies to effect resistance heating of the blank in the circumferential path of the dies thereagainst, and means to effect relative axial movement between the blank and dies.

9. In apparatus for electric forming operations, a plurality of circumferentially spaced electrode dies arranged in a circle to receive a cylindrical blank to be formed, means to move said dies radially into pressure contact with the work blank, means to rotate the blank in said dies, means to supply heating current to the dies to effect resistance heating of the blank in the circumferential path of the dies thereagainst, a pair of rotary chucks for gripping the blank at opposite ends thereof, and means to move said chucks longitudinally of the dies and relatively to one another.

SVEN WESTIN.